United States Patent
Mason et al.

(10) Patent No.: US 12,544,467 B2
(45) Date of Patent: Feb. 10, 2026

(54) NEEDLELESS CONNECTOR DISINFECTION DEVICES AND METHODS

(71) Applicant: CareFusion 303, Inc., San Diego, CA (US)

(72) Inventors: Gene Mason, La Habra Heights, CA (US); George Mansour, Diamond Bar, CA (US); Priya Saraf, Bengaluru (IN); Nimish Batra, Bengaluru (IN)

(73) Assignee: CAREFUSION 303, INC., San Diego, CA (US)

( * ) Notice: Subject to any disclaimer, the term of this patent is extended or adjusted under 35 U.S.C. 154(b) by 968 days.

(21) Appl. No.: 17/670,697

(22) Filed: Feb. 14, 2022

(65) Prior Publication Data

US 2022/0313852 A1  Oct. 6, 2022

Related U.S. Application Data

(60) Provisional application No. 63/170,890, filed on Apr. 5, 2021.

(51) Int. Cl.
*A61L 2/18* (2006.01)
*A61L 2/24* (2006.01)
(Continued)

(52) U.S. Cl.
CPC ..................... *A61L 2/18* (2013.01); *A61L 2/24* (2013.01); *A61L 2/28* (2013.01); *A61M 39/18* (2013.01);
(Continued)

(58) Field of Classification Search
CPC .................................................. A61M 39/18
See application file for complete search history.

(56) References Cited

U.S. PATENT DOCUMENTS 9,895,526 B2 * 2/2018 Korogi ............... A61M 39/165
2014/0228811 A1 8/2014 Charles et al.
(Continued)

FOREIGN PATENT DOCUMENTS

EP 2493528 B1 12/2019
JP 2006000642 A 1/2006
(Continued)

OTHER PUBLICATIONS

International Search Report and Written Opinion for Application No. PCT/US2022/016490, dated Jun. 1, 2022, 13 pages.
(Continued)

*Primary Examiner* — Elizabeth A Robinson
*Assistant Examiner* — Changru Chen
(74) *Attorney, Agent, or Firm* — MASCHOFF BRENNAN

(57) ABSTRACT

Needleless connector disinfecting devices are provided that include a body having a top surface and a bottom surface, a cavity in the body, the cavity configured to receive a needleless connector, an activation arm disposed on the body, a cartridge housing disposed on the activation arm, a swab cartridge disposed in the cartridge housing, and a disposal chamber disposed in the body, the disposal chamber configured to receive used cleaning swabs. The activation arm is configured to slidably move the cartridge housing on the top surface of the body between a non-biased position in which a bottommost cleaning swab in the swab cartridge is in contact with an end portion of a needleless connector and a biased position in which the cartridge housing is disposed over the disposal chamber. Additional needleless connector disinfecting devices and methods of using needleless connector disinfecting devices are also provided.

16 Claims, 10 Drawing Sheets

(51) Int. Cl.
  *A61L 2/28* (2006.01)
  *A61M 39/18* (2006.01)
(52) U.S. Cl.
  CPC ..... *A61L 2202/122* (2013.01); *A61L 2202/24* (2013.01)

(56) References Cited

U.S. PATENT DOCUMENTS

| | | | | |
|---|---|---|---|---|
| 2016/0158499 | A1* | 6/2016 | Helm | A61M 39/18 604/180 |
| 2016/0361488 | A1* | 12/2016 | Perrenoud | A61M 5/1408 |
| 2017/0203092 | A1 | 7/2017 | Ryan et al. | |
| 2020/0276346 | A1 | 9/2020 | Drmanovic | |
| 2021/0187198 | A1* | 6/2021 | Salari | A61M 5/3158 |

FOREIGN PATENT DOCUMENTS

| | | | |
|---|---|---|---|
| JP | 200983855 | A | 4/2009 |
| JP | 2010035873 | A | 2/2010 |
| JP | 2013188278 | A | 9/2013 |
| JP | 2014513569 | A | 6/2014 |
| JP | 2015533614 | A | 11/2015 |

OTHER PUBLICATIONS

Japanese Office Action for Application No. 2023-561142, dated Oct. 1, 2025, 4 pages including translation.

* cited by examiner

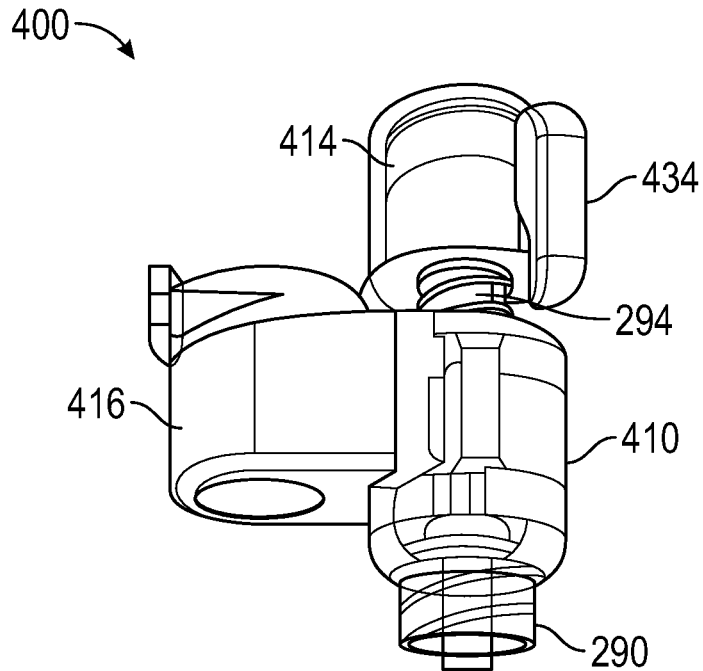
FIG. 10
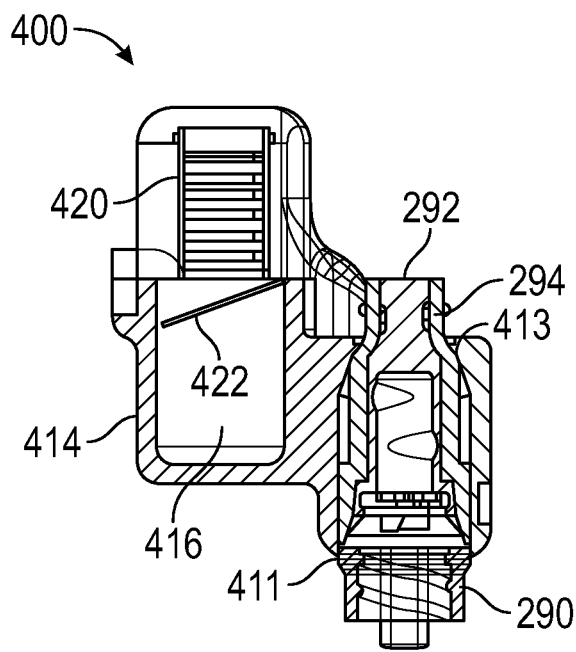 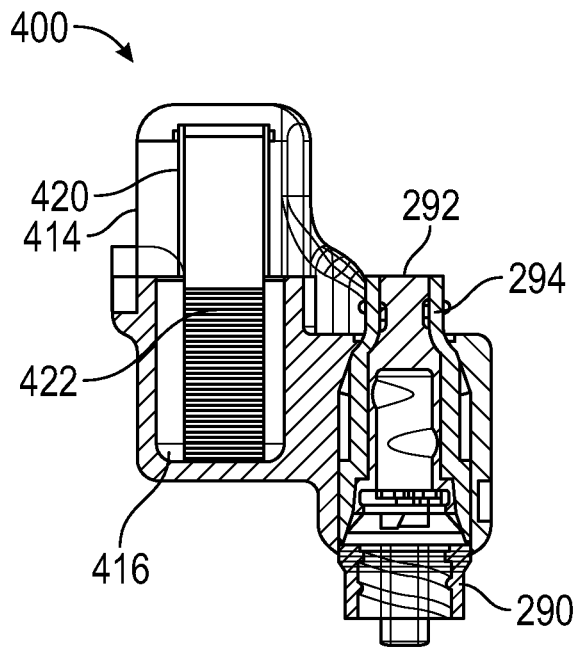
FIG. 11  FIG. 12

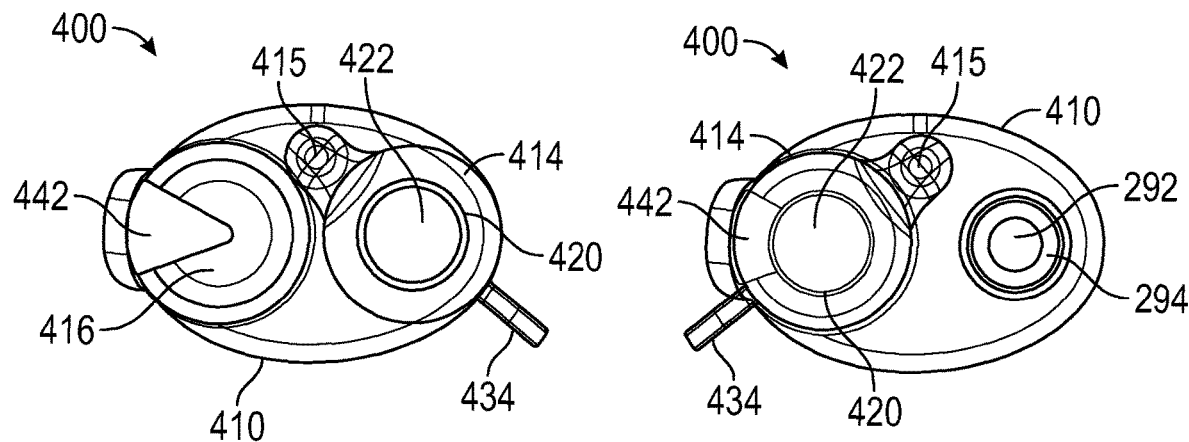
FIG. 14
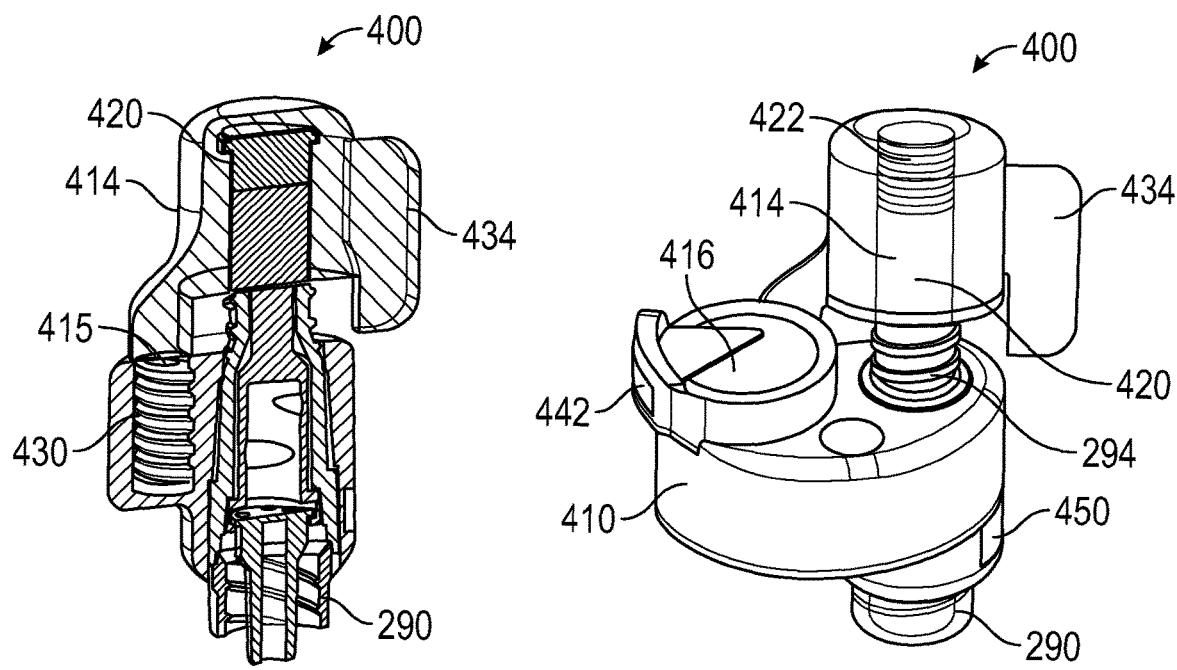
FIG. 15  FIG. 16

NEEDLELESS CONNECTOR DISINFECTION DEVICES AND METHODS

CROSS-REFERENCE TO RELATED APPLICATION

This application claims the benefit of priority under 35 U.S.C. § 119 to U.S. Provisional Patent Application Ser. No. 63/170,890, entitled "NEEDLELESS CONNECTOR DISINFECTION DEVICES AND METHODS," filed on Apr. 5, 2021, the entirety of which is incorporated herein by reference.

TECHNICAL FIELD

The present disclosure generally relates to needless connectors, in particular disinfection devices and methods for intravenous (IV) set needless connectors.

BACKGROUND

Typical infusion or IV sets are constructed by joining polymeric tubing segments to polymeric components, many of which have needleless connectors. Needless connectors are potential sites for intraluminal microbial contamination and require careful adherence to infection prevention practices during drug administration. Intraluminal contamination can lead to central line associated blood stream infection (CLABSI). Typical disinfection processes for needless connectors are to scrub the needless connector with isopropyl alcohol (IPA) swabs and dry, or to use disinfectant caps. Current Infusion Nurses Society (INS) standards recommend the disinfection of needleless connectors via a vigorous mechanical scrub and drying time prior to each entry into a vascular access device and that use of passive disinfection caps be considered. However, in the overloaded and hectic pace in current medical settings this standard is not routinely followed by clinicians and caregivers, thus leading to frequent occurrences of CLABSI.

Adherence to connector disinfection protocols is not routinely followed properly due to several reasons, such as protocols varying across clinicians and/or healthcare settings, manufacturers prescribing different lengths of scrub and dry times, and variability in clinician adherence to cap usage. This often results in incomplete disinfection of the connector and potentially increases the risk of bloodstream infections.

For these reasons, it is desirable to provide automated needless connector disinfection devices to ensure proper and complete disinfection for every use.

SUMMARY

In one or more embodiments, a needleless connector disinfecting device includes a body having a top surface and a bottom surface, a cavity in the body, the cavity configured to receive a needleless connector, an activation arm disposed on the body, a cartridge housing disposed on the activation arm, a swab cartridge disposed in the cartridge housing, and a disposal chamber disposed in the body, the disposal chamber configured to receive used cleaning swabs, wherein the activation arm is configured to slidably move the cartridge housing on the top surface of the body between a non-biased position in which a bottommost cleaning swab in the swab cartridge is in contact with an end portion of a needleless connector and a biased position in which the cartridge housing is disposed over the disposal chamber.

In one or more embodiments, a needleless connector disinfecting device includes a body having a top surface and a bottom surface, a cavity in the body, the cavity configured to receive a needleless connector, a cartridge housing pivotably disposed on the top surface of the body, an activation arm disposed on the cartridge housing, a swab cartridge disposed in the cartridge housing, and a disposal chamber disposed in the body, the disposal chamber configured to receive used cleaning swabs, wherein the cartridge housing is configured to pivotably move on the top surface of the body between a non-biased position in which a bottommost cleaning swab in the swab cartridge is in contact with an end portion of a needleless connector and a biased position in which the cartridge housing is disposed over the disposal chamber.

In one or more embodiments, a method of using a needleless connector disinfecting device includes pivoting a securing member out from a body of the needleless connector disinfecting device, inserting a needleless connector through a connector port in a bottom surface of the body and into a cavity of the body, contacting an end portion of the needleless connector with a bottommost cleaning swab in a cartridge housing disposed on a top surface of the body, pivoting the securing member into the body to secure the needleless connector within the cavity, exerting a force on an activation arm to move the cartridge housing from a non-biased position to a biased position, wherein in the non-biased position the cartridge housing is disposed over a syringe port that is aligned with the connector port and the cavity, and wherein in the biased position the cartridge housing is disposed over a disposal chamber in the body, separating the bottommost cleaning swab with a separating blade disposed over the disposal chamber when the cartridge housing is moved into the biased position, receiving the separated cleaning swab into the disposal chamber, releasing the force on the activation arm, moving the cartridge housing from the biased position back to the non-biased position via a spring member, and contacting the end portion of the needleless connector with a bottommost cleaning swab in the cartridge housing.

BRIEF DESCRIPTION OF THE DRAWINGS

The accompanying drawings, which are included to provide further understanding of the disclosure and are incorporated in and constitute a part of this specification, illustrate embodiments of the disclosure and together with the description serve to explain the principles of the disclosure.

FIG. 10 depicts a perspective view of one or more embodiments of a needleless connector disinfecting device, according to aspects of the disclosure.

FIG. 11 depicts a cross-sectional side view of the needleless connector disinfecting device of FIG. 10 at a first use, according to aspects of the disclosure.

FIG. 12 depicts a cross-sectional side view of the needleless connector disinfecting device of FIG. 10 after a last use, according to aspects of the disclosure.

FIG. 14 depicts top views of a workflow use of the needleless connector disinfecting device of FIG. 10, according to aspects of the disclosure.

FIG. 15 depicts a cross-sectional perspective view of the needleless connector disinfecting device of FIG. 10, according to aspects of the disclosure.

FIG. 16 depicts a perspective view of the needleless connector disinfecting device of FIG. 10, according to aspects of the disclosure.

DETAILED DESCRIPTION

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Figure 1:
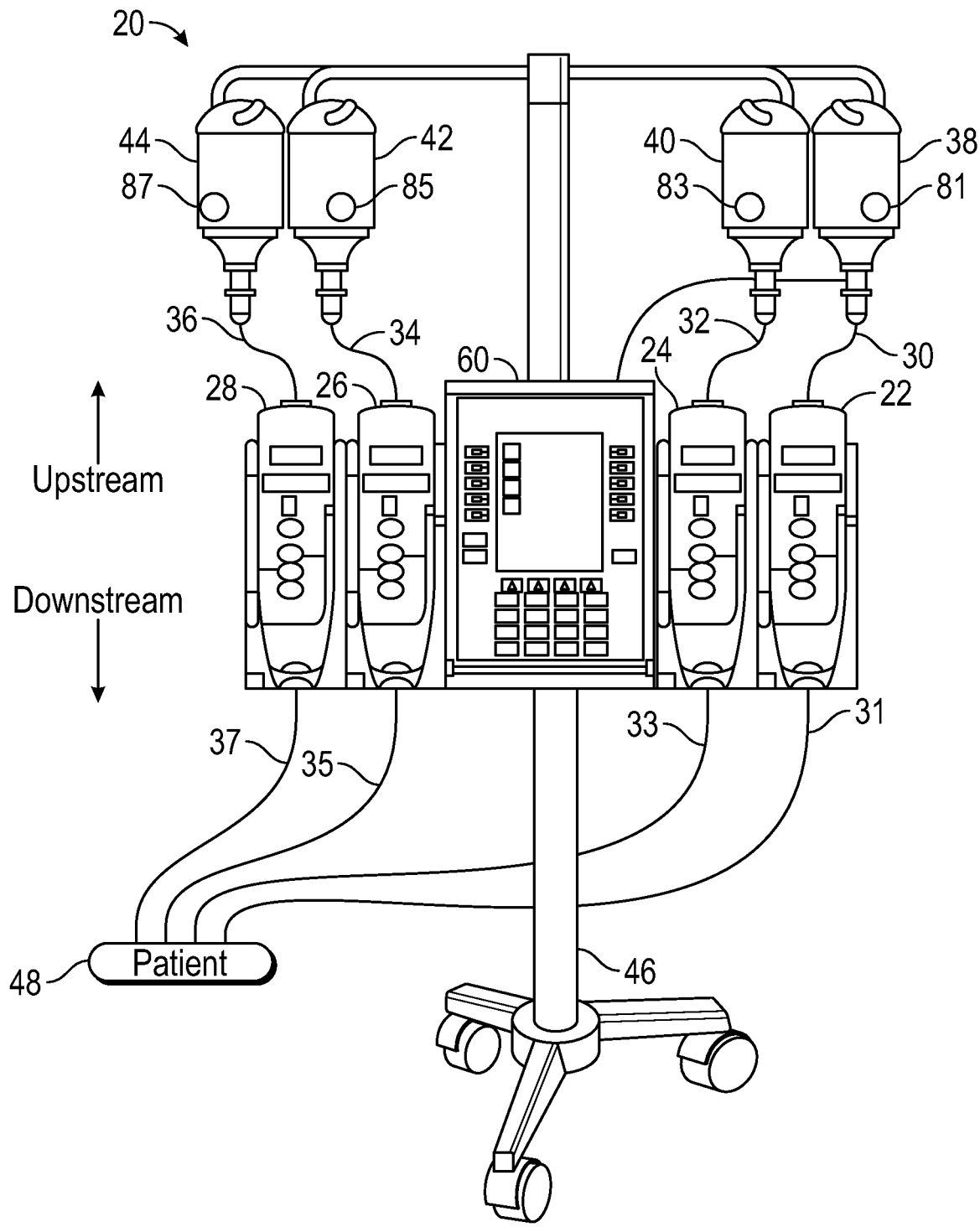
FIG. 1 depicts a perspective view of an example patient care system having four fluid infusion pumps, each of which is connected to a respective fluid supply for pumping the contents of the fluid supply to a patient.

Referring now in more detail to the drawings in which like reference numerals refer to like or corresponding elements among the several views, there is shown in FIG. 1 a patient care system 20 having four infusion pumps 22, 24, 26, and 28 each of which is fluidly connected with an upstream fluid line 30, 32, 34, and 36, respectively. Each of the four infusion pumps 22, 24, 26, and 28 is also fluidly connected with a downstream fluid line 31, 33, 35, and 37, respectively. The fluid lines can be any type of fluid conduit, such as an IV administration set, through which fluid can flow through. It should be appreciated that any of a variety of pump mechanisms can be used including syringe pumps.

Fluid supplies 38, 40, 42, and 44, which may take various forms but in this case are shown as bottles, are inverted and suspended above the pumps. Fluid supplies may also take the form of bags or other types of containers including syringes. Both the patient care system 20 and the fluid supplies 38, 40, 42, and 44 are mounted to a roller stand, IV pole 46, table top, etc.

A separate infusion pump 22, 24, 26, and 28 is used to infuse each of the fluids of the fluid supplies into the patient. The infusion pumps are flow control devices that will act on the respective fluid line to move the fluid from the fluid supply through the fluid line to the patient 48. Because individual pumps are used, each can be individually set to the pumping or operating parameters required for infusing the particular medical fluid from the respective fluid supply into the patient at the particular rate prescribed for that fluid by the physician. Such medical fluids may include drugs or nutrients or other fluids. The infusion pumps 22, 24, 26, and 28 are controlled by a pump control unit 60.

Fluid supplies 38, 40, 42, and 44 are each coupled to an electronic data tag 81, 83, 85, and 87, respectively, or to an electronic transmitter. Any device or component associated with the infusion system may be equipped with an electronic data tag, reader, or transmitter.

Typical infusion sets may also be gravity sets that do not require use of an infusion pump. For example, any of fluid supplies 38, 40, 42, and 44 may be directly connected to the patient 48 via a gravity IV set, wherein gravity causes the fluid to flow through the infusion set and into the patient 48 without the aid of a pump.

Figure 2:
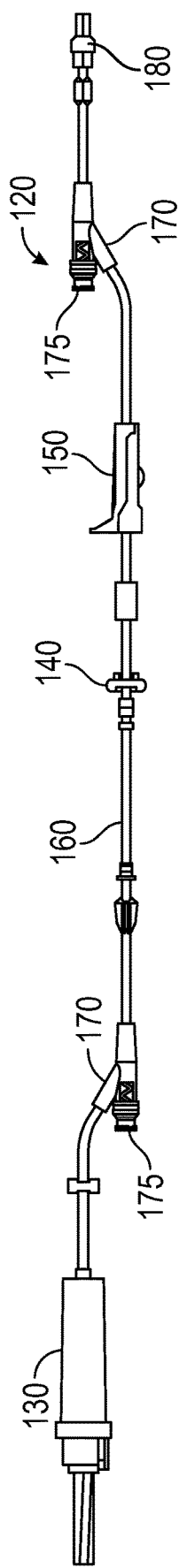
FIG. 2 is a top view of a typical assembled IV infusion set.

Typically, medical fluid administration sets have more parts than are shown in FIG. 1, such as those shown in FIG. 2. Infusion sets may be formed from any combination of infusion components and tubing. Typically, the infusion components and tubing are disposable products that are used once and then discarded. The infusion components and tubing may be formed from any suitable material (e.g., plastic, silicone, rubber), many or all of which are clear or translucent so that the fluid flow or levels inside can be seen.

As shown in FIG. 2, an infusion set 120 may include a drip chamber 130, a check valve 140 and a roller clamp 150 connected together by tubing 160. The infusion set 120 may also include a Y-site 170 having a Y-shaped junction with a needleless connector 175, as well as a luer lock connector 180 at the end of the infusion set 120. The luer lock connector 180 may be used for connection to a catheter inserted into a patient, for example. The infusion set 120 may include additional infusion components and may be formed of any combination of components and the tubing 160.

Figure 3B:
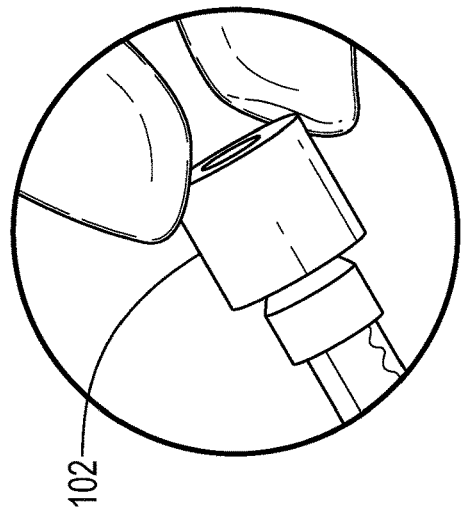
FIGS. 3A and 3B depict perspective views of typical needless connector disinfecting processes.
Figure 3A:
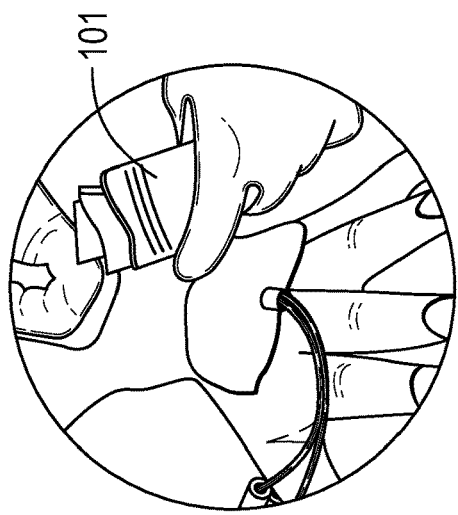
Figure 4:
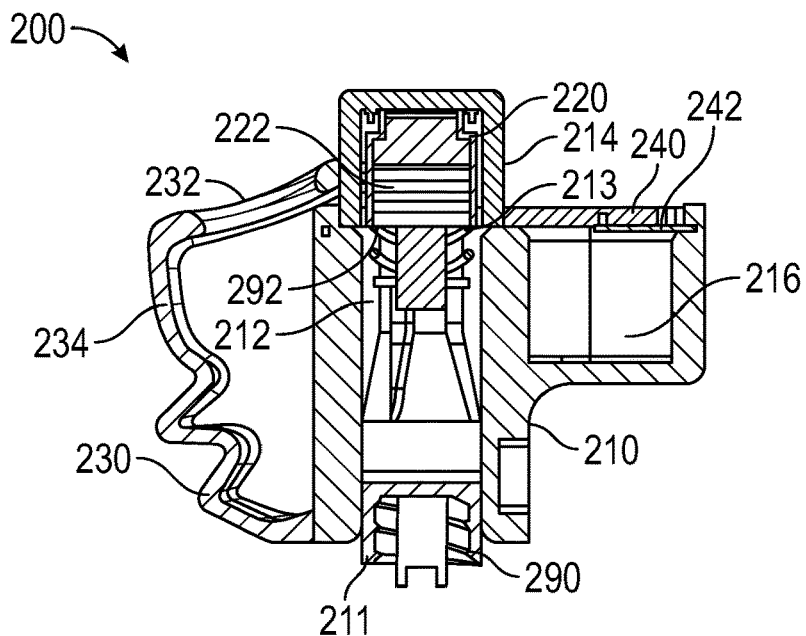
FIG. 4 depicts a cross-sectional side view of one or more embodiments of a needless connector disinfecting device, according to aspects of the disclosure.
Figure 5:
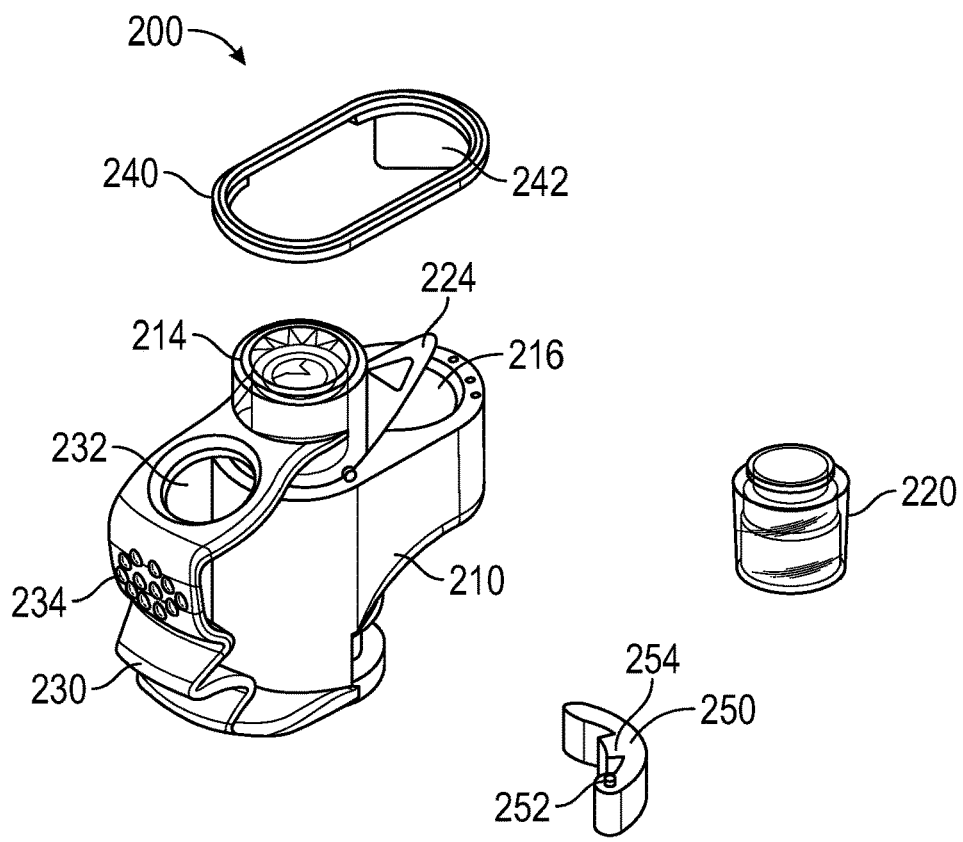
FIG. 5 depicts an exploded perspective view of the needless connector disinfecting device of FIG. 4, according to aspects of the disclosure.
Figure 6:
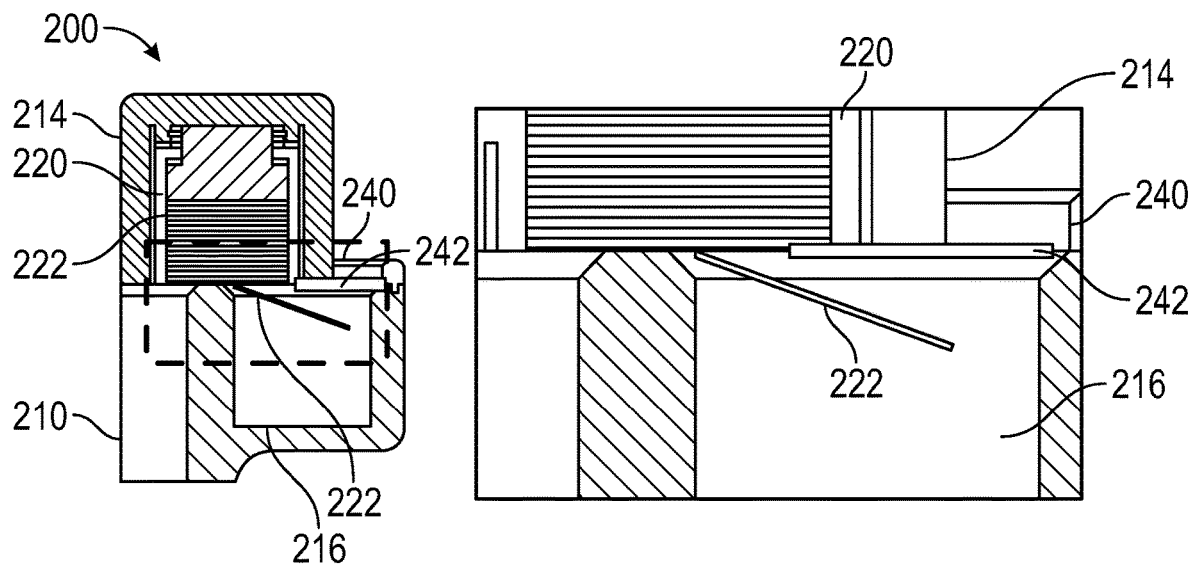
FIG. 6 depicts a cross-sectional side view of a swab disposal use of the needless connector disinfecting device of FIG. 4, according to aspects of the disclosure.
Figure 7:
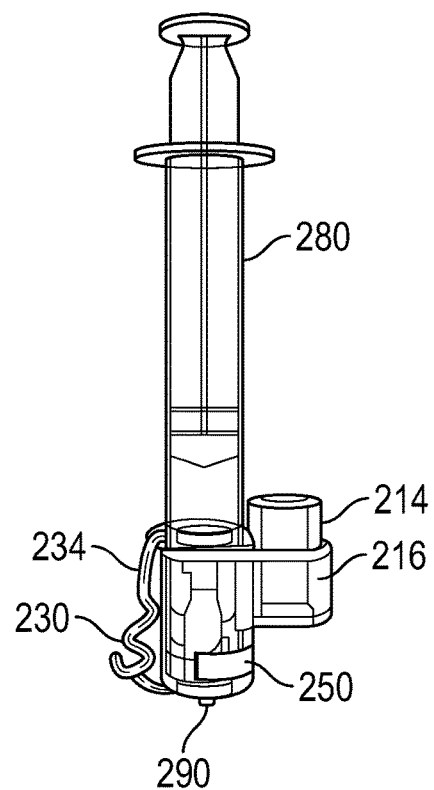
FIG. 7 depicts a perspective view of a needleless syringe engaged with the needless connector disinfecting device of FIG. 4, according to aspects of the disclosure.

As shown in FIG. 3A, a typical method of disinfecting a needleless connector is to obtain an IPA swab 101 and scrub the needleless connector and then allow to air dry or pat dry with sterile gauze or cloth. This requires the clinician to remember to do this cleaning task, to find a new IPA swab and to find a clean cloth or to wait sufficient time for air drying. Another typical method used in conjunction with or in lieu of IPA swab cleaning is to use a passive disinfectant cap 102 as shown in FIG. 3B.

FIGS. 4-7 show a needleless connector disinfecting device 200 for automatically cleaning a needleless connector 290, according to aspects of the disclosure. The needleless connector disinfecting device 200 includes a body 210 with a cavity 212 configured to receive the needleless connector 290 through a connector port 211 and to receive a needleless syringe 280 through a syringe port 213. For example, the cavity 212 may slide over and enclose a portion of or all of the needleless connector 290 through the connector port 211. Similarly, the cavity 212 may slide over and enclose a portion of the needleless syringe 280 through the syringe port 213.

The body 210 also includes a cartridge holder 214 configured to receive a swab cartridge 220. The swab cartridge 220 contains multiple individual cleaning swabs 222 (e.g., chlorhexidine swabs, IPA swabs) arranged in a stack within the swab cartridge 220. For example, the swab cartridge 220 may contain 40 stacked cleaning swabs 222 and the needless connector disinfecting device 200 may be designed to be discarded after using the last of the 40 cleaning swabs 222. The last cleaning swab 222 may be colored (e.g., red) to provide a visual indication that the last cleaning swab 222 is being used. Visibility of the colored cleaning swab 222 may indicate that the entire needless connector disinfecting device 200 should be disposed or that the existing swab cartridge 220 needs to be replaced with a new swab cartridge 220.

According to aspects of the disclosure, the needless connector disinfecting device 200 may be designed for continuous use after using the last of the 40 cleaning swabs 222 by simply replacing the used swab cartridge 220 with a new swab cartridge 220 having a fresh supply of cleaning swabs 222. A cartridge seal 224 may be arranged to cover the bottom of the swab cartridge 220 and/or the cartridge holder 214 before initial use of the needless connector disinfecting device 200. The cartridge seal 224 may seal in the moisture of the cleaning solution in the cleaning swabs 222 and keep the bottom surface of the bottom cleaning swab 222 clean before first use.

The body 210 also includes a disposal chamber 216 arranged adjacent to the cavity 212. The disposal chamber 216 is configured to receive each cleaning swab 222 after being used to clean an end face 292 of the needleless connector 290. The disposal chamber 216 is sized to receive all of the cleaning swabs 222 contained in the full swab cartridge 220, such as 40 used cleaning swabs 222 in the example discussed above. In aspects of the disclosure, the disposal chamber 216 may be sized to receive used cleaning swabs 222 from multiple swab cartridges 220, such as when the needless connector disinfecting device 200 is configured to use replacement swab cartridges 220.

A springy hinge arm 230 extends from the body 210, the springy hinge arm 230 having a syringe alignment opening 232 and an ergonomic thumb grip 234. The syringe alignment opening 232 is configured to align with the cavity 212 when the springy hinge arm 230 is positioned to allow insertion of a needleless syringe 280 through the syringe alignment opening 232 and into the needless connector disinfecting device 200. The ergonomic thumb grip 234 may be textured (e.g., raised bumps, patterned) to provide a non-slip surface for a user to push the springy hinge arm 230 toward the body 210, even if the user's thumb or fingers are wet.

The springy hinge arm 230 may be a flexible hinge having a biasing force that enables a return motion of the springy hinge arm 230 (e.g., automatically springs back to a standing position) once the needleless syringe 280 is removed from the needleless connector disinfecting device 200. The springy hinge arm 230 is configured to slidingly move the cartridge holder 214 with an enclosed swab cartridge 220 between a closed position where the cartridge holder 214 covers the syringe port 213 and an open position where the syringe alignment opening 232 is aligned with the syringe port 213. During this sliding movement of the cartridge holder 214, the bottom cleaning swab 222 in the cartridge holder 214 wipes across the end face 292 of the needleless connector 290 and is moved over and discarded into the disposal chamber 216. When the needleless syringe 280 is removed, the biasing force of the springy hinge arm 230 pulls the cartridge holder 214 back into position over the syringe port 213, where the new fresh bottom cleaning swab is in contact with the end face 292 of the needleless connector 290 to begin a new disinfecting action of the end face 292.

A blade cover 240 is arranged on the syringe port 213 side of the body 210. For example, the blade cover 240 may be an oval shape that acts as a guide rail for the back and forth movement of the cartridge holder 214. The blade cover 240 includes a separating blade 242 arranged over a portion of the disposal chamber 216. The separating blade 242 may be positioned to enter the stack of cleaning swabs 222 just above the bottommost (e.g., used) cleaning swab 222 when the cartridge holder 214/swab cartridge 220 are moved over the disposal chamber 216, thus separating (e.g., peeling off) the bottommost cleaning swab 222 to fall into the disposal chamber 216. The separating blade 242 may be any suitable material, such as Teflon™ for example.

A securing member 250 may be coupled to the body 210. The securing member 250 may be swivel mounted to the body 210 via hinge pins 252, where the securing member 250 may be in a swiveled out (e.g., pulled out) position when the needless connector disinfecting device 200 is being mated or coupled with the needleless connector 290, and where the securing member 250 may be pushed into a swiveled in (e.g., pushed in) position to secure or lock the needless connector disinfecting device 200 to the needless connector 290. The securing member 250 may include a lock protrusion 254 that engages a surface of the needleless connector 280 to secure the needless connector disinfecting device 200 and the needless connector 290 together. When the needless connector disinfecting device 200 is to be decoupled from the needless connector 290, the securing member 250 may be pulled and swiveled outwards from the body 210, thereby disengaging the lock protrusion 254 from the needleless connector 290.

In operation, the user holds the needless connector disinfecting device 200 and presses the springy hinge arm 230 (e.g., spring-loaded lever), which slides the cartridge holder 214/swab cartridge 220 from the closed position to the open position, thus allowing access to the syringe port 213 for the needleless syringe 280. In the sliding action, the used cleaning swab 222 slides, gets separated from the stack of unused cleaning swabs 222 and falls into the disposal chamber 216. When the springy hinge arm 230 is released, the swab cartridge 220 will have a fresh cleaning swab 222 in contact with the needleless connector 290, thus performing a disinfecting action.

Figure 8:
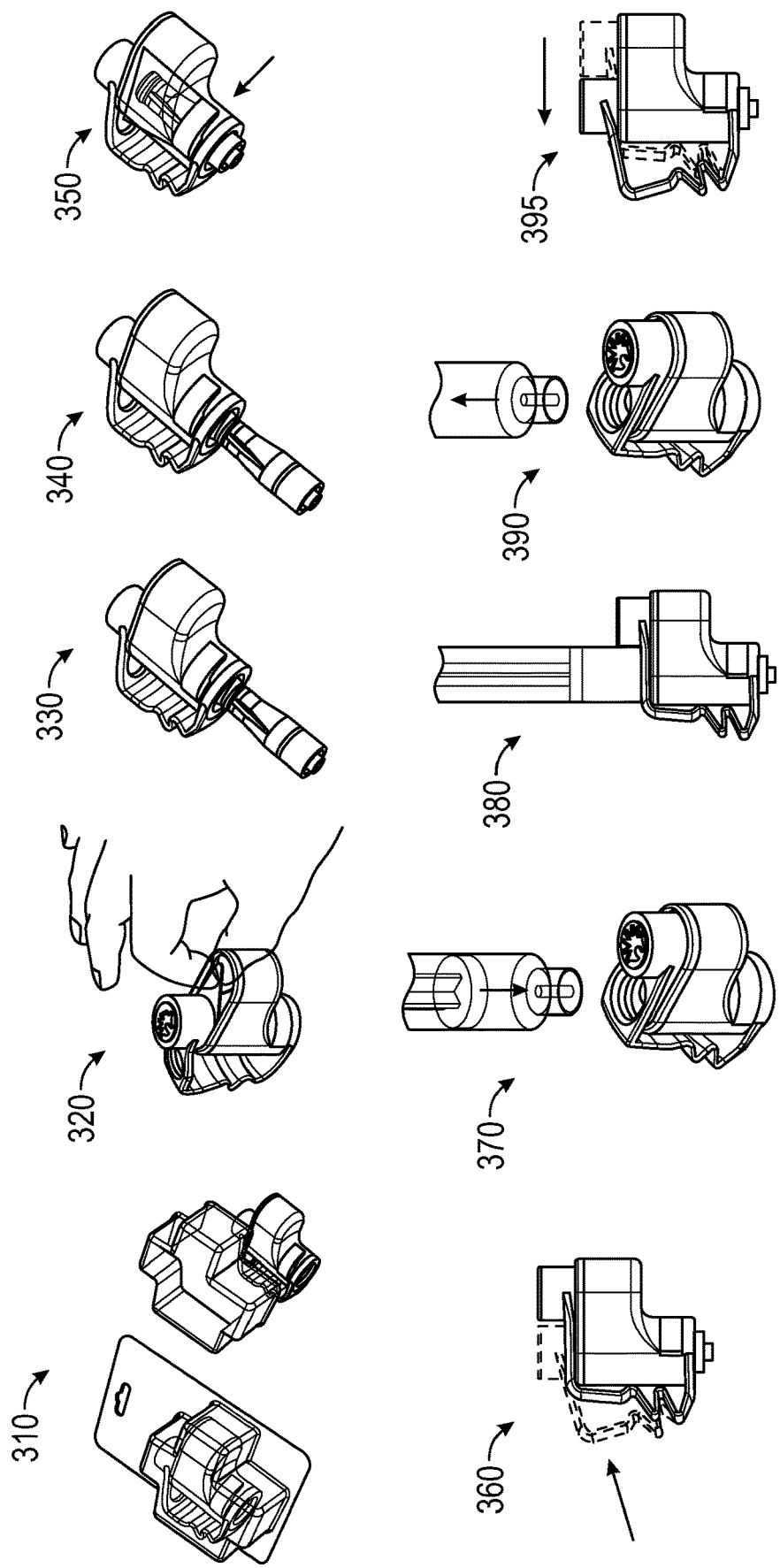
FIG. 8 depicts perspective views of a workflow use of the needleless connector disinfecting device of FIG. 4, according to aspects of the disclosure.
Figure 9:
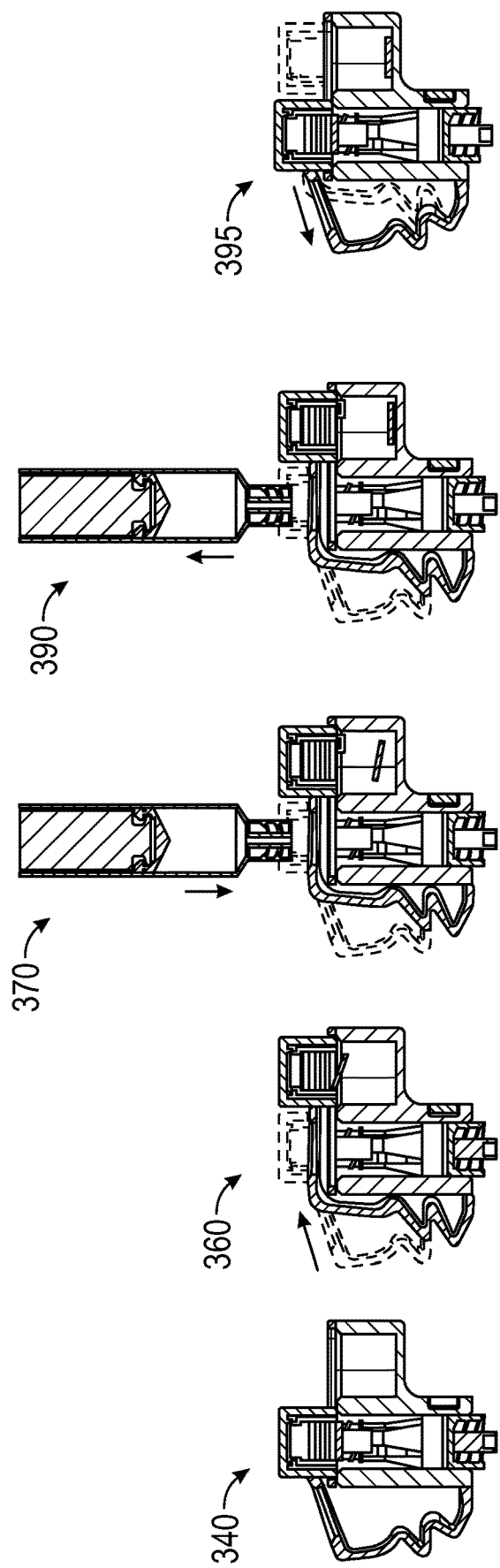
FIG. 9 depicts cross-sectional side views of a workflow use of the needleless connector disinfecting device of FIG. 4, according to aspects of the disclosure.
Figure 13:
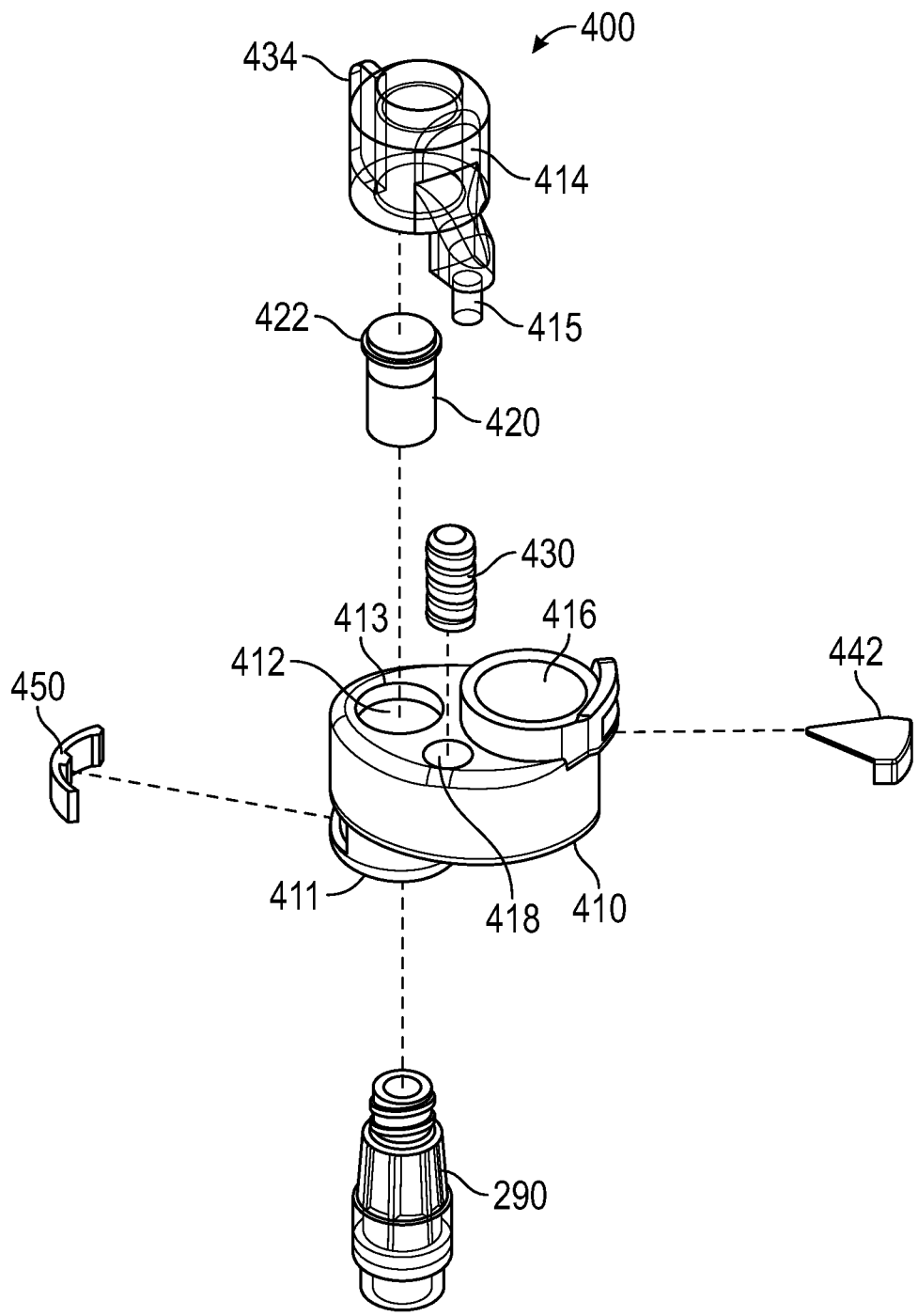
FIG. 13 depicts an exploded perspective view of the needleless connector disinfecting device of FIG. 10, according to aspects of the disclosure.

Turning to FIGS. 8 and 9, a method 300 of using a needless connector disinfecting device (e.g., needless connector disinfecting device 200) is provided, in aspects of the disclosure. In step 310, the needless connector disinfecting device is removed from its packaging. Here, the entire device may be shipped/stored in a sterile sealed package (e.g., shrink wrapped, heat sealed plastic). A seal (e.g., cartridge seal 224) is pulled out and removed in step 320. This seal is what protects the bottom surface of the first cleaning swab (e.g., cleaning swab 222) in the cartridge (e.g., swab cartridge 220) and protects the stack of cleaning swabs in the cartridge during shipping/storage and prior to use. In step 330, the needless connector disinfecting device is aligned with a needleless connector (e.g., needleless connector 290) and the needleless connector is inserted into the needleless connector disinfecting device (e.g., through connector port 211 into cavity 212) in step 340.

In step 350, the needleless connector disinfecting device is locked to the needleless connector (e.g., securing member 250 is moved inward so that the securing protrusion 254 engages the needleless connector 290). An activation arm (e.g., springy hinge arm 230) is pressed inward towards the main body (e.g., body 210), causing the cartridge housing (e.g., cartridge housing 214) to slide over a disposal chamber (e.g., disposal chamber 216) and providing access to a syringe port (e.g., syringe port 213 through syringe alignment opening 232), in step 360. Here, when the cartridge housing slides into position over the disposal chamber, a blade (e.g., separating blade 242) pushes into the swab stack above the bottom swab (e.g., used cleaning swab 222), separating the used swab from the stack so that the used swab drops into the disposal chamber.

In step 370, a syringe (e.g., needleless syringe 280) is aligned with the open syringe port, and the syringe is inserted into the syringe port and locked or secured with the exposed top (e.g., end face 292) of the needleless connector in step 380. After the desired contents of the syringe are transferred/pushed into the needleless connector, the syringe is unlocked and removed from the needleless connector disinfecting device in step 390. In step 395, the activation arm is released and a biasing tension in the activation arm causes the activation arm to spring back to its default (e.g., non-biased) position, which causes the coupled swab cartridge to slide back over and cover the syringe port. Here, the bottommost swab (e.g., fresh unused cleaning swab 222) in the swab stack comes into contact with the end of the needleless connector, thus disinfecting the end face, and the swab stays in contact with the end face until the next use of the needleless connector disinfecting device, thus providing continued disinfection and protection of the end face.

Turning to FIG. 9, the internal mechanisms of the device during a first use of the method 300 are shown more clearly. In step 340, the top portion of the needleless connector 290 is disposed within the cavity 212 of the housing through the connector port 211 and the securing member 250 is in the closed and secured position, thus securing the needleless connector disinfecting device 200 to the needleless connector 290. As can be clearly seen, the first cleaning swab 222 is engaged with the end face 292 and the springy hinge arm 230 is in the default non-biased position.

In step 360, when the ergonomic thumb grip 234 is pushed in, the springy hinge arm 230 moves inward towards the body 210, aligning the syringe alignment opening 232 with the syringe port 213 and disposing the cartridge housing 214/swab cartridge 220 over the disposal chamber 216, where the bottom used cleaning swab 222 is removed from the swab stack by the separating blade 242 and drops into the disposal chamber 216.

In step 370, the needleless syringe 280 is inserted into the syringe port 213 and even if the springy hinge arm 230 is released by the user, it will be held in place while the needleless syringe 280 is disposed within the syringe port 213. Similarly, in step 390, when the needleless syringe 280 is removed or pulled out of the needleless connector disinfecting device 200, if the user is not pressing inward on the ergonomic thumb grip 234, the springy hinge arm 230 will spring back to its default position. If on the other hand, the user is applying an inward force on the ergonomic thumb grip 234 when the needleless syringe 280 is removed, the springy hinge arm 230 will stay in a biased position until the user releases or relaxes the inward force. In either case, once the springy hinge arm 230 has returned to its non-biased position in step 395, the used cleaning swab 222 is disposed on the bottom of the disposal chamber 216 and the bottommost new cleaning swab 222 is in place on the end face 292 of the needleless connector 290.

FIGS. 10-16 show a needless connector disinfecting device 400 for automatically cleaning a needless connector 290, according to aspects of the disclosure. The needless connector disinfecting device 400 includes a body 410 with a cavity 412 configured to receive the needleless connector 290 through a connector port 411 and to receive a needleless syringe 280 through a syringe port 413. For example, the cavity 412 may slide over and enclose a portion of or all of the needleless connector 290 through the connector port 411. In aspects of the disclosure, an end portion 294 of the needleless connector 290 slides all the way through the cavity 412 and out the syringe port 413.

The body 410 also includes a cartridge holder 414 configured to receive a swab cartridge 420. The swab cartridge 420 contains multiple individual cleaning swabs 422 (e.g., chlorhexidine swabs, IPA swabs) arranged in a stack within the swab cartridge 420. For example, the swab cartridge 420 may contain 40 stacked cleaning swabs 422 and the needless connector disinfecting device 400 may be designed to be discarded after using the last of the 40 cleaning swabs 422. The last cleaning swab 422 may be colored (e.g., red) to provide a visual indication that the last cleaning swab 422 is being used. Visibility of the colored cleaning swab 422 may indicate that the entire needless connector disinfecting device 400 should be disposed or that the existing swab cartridge 420 needs to be replaced with a new swab cartridge 420.

According to aspects of the disclosure, the needless connector disinfecting device 400 may be designed for continuous use after using the last of the 40 cleaning swabs 422 by simply replacing the used swab cartridge 420 with a new swab cartridge 420 having a fresh supply of cleaning swabs 422.

The body 410 also includes a disposal chamber 416 arranged adjacent to the cavity 412. The disposal chamber 416 is configured to receive each cleaning swab 422 after being used to clean an end face 292 of the needleless connector 290. The disposal chamber 416 is sized to receive all of the cleaning swabs 422 contained in the full swab cartridge 420, such as 40 used cleaning swabs 422 in the example discussed above. In aspects of the disclosure, the disposal chamber 416 may be sized to receive used cleaning swabs 422 from multiple swab cartridges 420, such as when the needless connector disinfecting device 400 is configured to use replacement swab cartridges 420.

A separating blade 442 may be positioned to enter the stack of cleaning swabs 422 just above the bottommost (e.g., used) cleaning swab 422 when the cartridge holder 414/swab cartridge 420 are moved over the disposal chamber 416, thus separating (e.g., peeling off) the bottommost cleaning swab 422 to fall into the disposal chamber 416. The separating blade 442 may be any suitable material, such as Teflon™ for example.

A spring 430 and a pivot portion 415 of the cartridge housing 414 may be disposed in a pivot chamber 418 of the body 410, the spring 430 being configured to provide a biasing force on the cartridge housing 414. The cartridge housing 414 also includes an ergonomic thumb grip 434 that provides a surface for exerting force to cause the cartridge housing 414 to pivot about the pivot portion 415. The ergonomic thumb grip 434 may be textured (e.g., raised bumps, patterned) to provide a non-slip surface for a user to push on and pivot the cartridge housing 414 even if the user's thumb or fingers are wet.

The biasing force of the spring 430 enables a return pivot motion of the cartridge housing 414 (e.g., automatically springs back to a default or standing position) once the needleless syringe 280 is removed from the needless connector disinfecting device 400 or the user releases the ergonomic thumb grip 434. The spring 430 is configured to pivotably move the cartridge holder 414 with an enclosed swab cartridge 420 between a closed position where the cartridge holder 414 covers the end portion 294 of the needleless connector 290 and an open position where the syringe cartridge holder 414 is aligned with the disposal chamber 416. During this pivoting movement of the cartridge holder 414, the bottom cleaning swab 422 in the cartridge holder 414 wipes across the end face 292 of the needleless connector 290 and is moved over and discarded into the disposal chamber 416. When the needleless syringe 280 is removed and the ergonomic thumb grip 434 is released, the biasing force of the spring 430 pivots the cartridge holder 414 back into position over the end portion 294 of the needleless connector 290 protruding from the syringe port 413, where the new fresh bottom cleaning swab is in contact with the end face 292 of the needleless connector 290 to begin a new disinfecting action of the end face 292.

A securing member 450 may be coupled to the body 410. The securing member 450 may be swivel mounted to the body 410 via hinge pins 452, where the securing member 450 may be in a swiveled out (e.g., pulled out) position when the needless connector disinfecting device 400 is being mated or coupled with the needless connector 290, and where the securing member 450 may be pushed into a swiveled in (e.g., pushed in) position to secure or lock the needless connector disinfecting device 400 to the needless connector 290. The securing member 450 may include a lock protrusion 454 that engages a surface of the needleless connector 280 to secure the needless connector disinfecting device 400 and the needleless connector 290 together. When the needleless connector disinfecting device 400 is to be decoupled from the needleless connector 290, the securing member 450 may be pulled and swiveled outwards from the body 410, thereby disengaging the lock protrusion 454 from the needleless connector 290.

In operation, the user holds the needless connector disinfecting device 400 and presses the ergonomic thumb grip 434, which swivels the cartridge holder 414/swab cartridge 420 from the closed position to the open position, thus allowing access to the syringe port 413 for the needleless syringe 280. In the pivoting action, the used cleaning swab 422 slides, gets separated from the stack of unused cleaning swabs 422 and falls into the disposal chamber 416. When the ergonomic thumb grip 434 is released, the spring 430 pivots the cartridge holder 414/swab cartridge 420 back to the closed position where the swab cartridge 420 will have a fresh cleaning swab 422 in contact with the needleless connector 290, thus performing a disinfecting action. In aspects of the disclosure, the pivoting action may be over any suitable angle, such as 105 degrees for example (FIG. 14).

Figure 17:
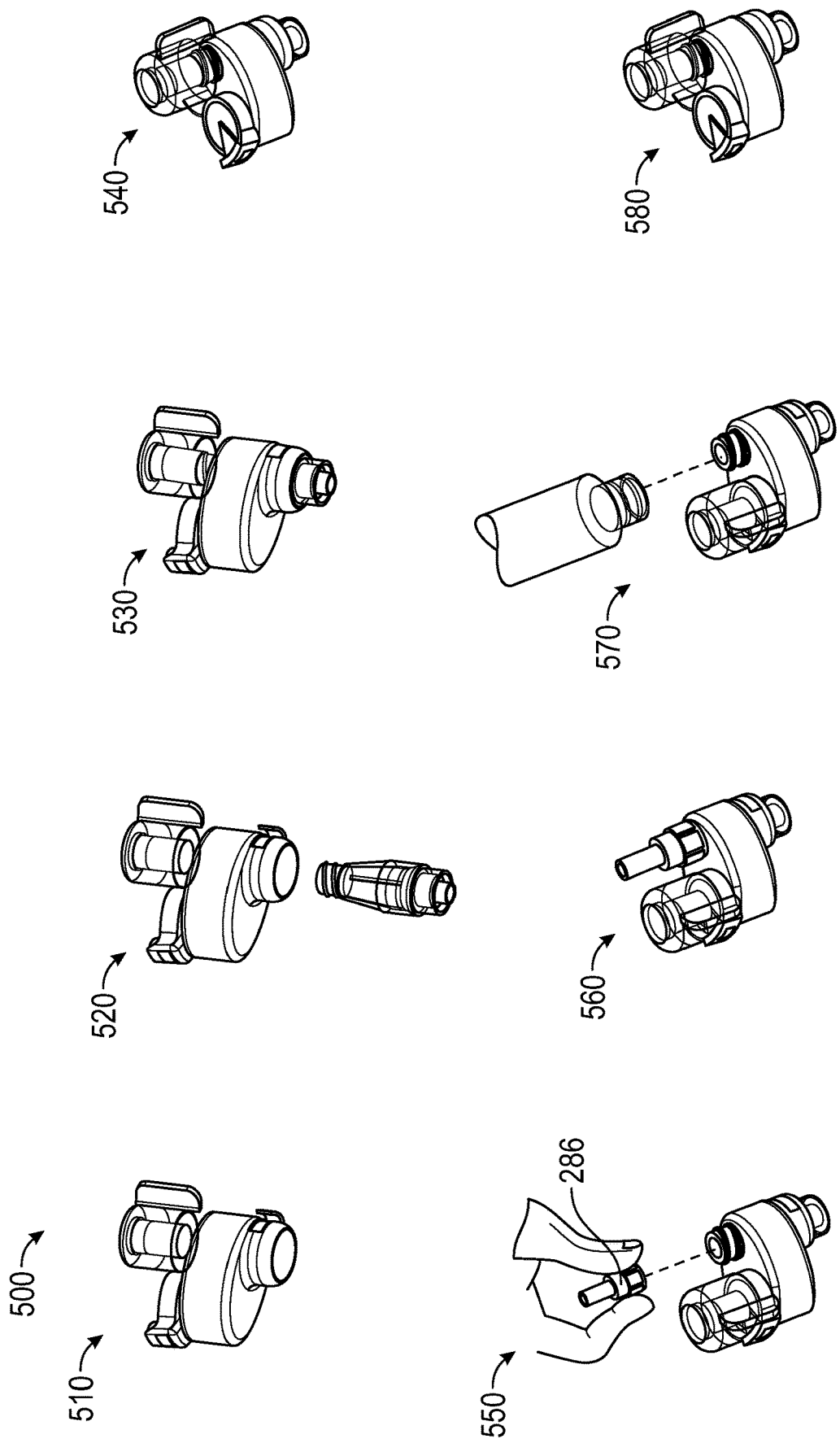
FIG. 17 depicts perspective views of a workflow use of the needleless connector disinfecting device of FIG. 10, according to aspects of the disclosure.

Turning to FIG. 17, a method 500 of using a needless connector disinfecting device (e.g., needless connector disinfecting device 400) is provided, in aspects of the disclosure. In step 510, once the needleless connector disinfecting device is removed from its packaging, a quick release lock (e.g., securing member 450) is opened (e.g., pulled/pivoted out from the body 410). Here, the entire needless connector disinfecting device may be shipped/stored in a sterile sealed package (e.g., shrink wrapped, heat sealed plastic). A needless connector (e.g., needleless connector 290) is inserted into the needleless connector disinfecting device (e.g., through connector port 411 into cavity 412) in step 520. Here, an end portion (e.g., end portion 294) of the needleless connector may pass all the way through the cavity to protrude out of a syringe port (e.g., syringe port 413) so that the end portion (e.g., end face 292) contacts the bottommost swab (e.g., cleaning swab 422) in a cartridge (e.g., swab cartridge 420). In step 530, the quick release lock is pushed/pivoted back to lock in the needleless connector (e.g., lock protrusion 454 engages a surface of the needleless connector 280), thus securing the needless connector disinfecting device and the needleless connector together.

An activation arm (e.g., ergonomic thumb grip 434) is pressed to pivot the cartridge housing (e.g., cartridge housing 414) on the main body (e.g., body 410), causing the cartridge housing to pivot over a disposal chamber (e.g., disposal chamber 416) and providing access to a syringe port (e.g., syringe port 413), in step 540. Here, when the cartridge housing pivots into position over the disposal chamber, a blade (e.g., separating blade 442) pushes into the swab stack above the bottom swab (e.g., used cleaning swab 422), separating the used swab from the stack so that the used swab drops into the disposal chamber.

In step 550, a syringe spinlock (e.g., syringe male spinlock 286) is aligned with the open syringe port and protruding end portion of the needleless connector. The syringe spinlock is inserted onto the end portion of the needleless connector and locked or secured to the exposed end portion of the needleless connector in step 560. Here, the syringe is aligned with the needleless connector. In step 570, after the desired contents of the syringe are transferred/pushed into the needleless connector, the syringe is unlocked and removed from the needleless connector disinfecting device.

In step 580, the activation arm is released and a biasing tension in a spring (e.g., spring 430) causes the cartridge housing to pivot back to its default (e.g., non-biased) position, which causes the coupled swab cartridge to pivot back over and cover the syringe port and protruding end portion of the needleless connector. Here, the bottommost swab (e.g., fresh unused cleaning swab 422) in the swab stack comes into contact with the end of the needleless connector, thus disinfecting the end face, and the swab stays in contact with the end face until the next use of the needleless connector disinfecting device, thus providing continued disinfection and protection of the end face.

In one or more embodiments, a needleless connector disinfecting device comprises a body having a top surface and a bottom surface, a cavity in the body, the cavity configured to receive a needleless connector, an activation arm disposed on the body, a cartridge housing disposed on the activation arm, a swab cartridge disposed in the cartridge housing, and a disposal chamber disposed in the body, the disposal chamber configured to receive used cleaning swabs, wherein the activation arm is configured to slidably move the cartridge housing on the top surface of the body between a non-biased position in which a bottommost cleaning swab in the swab cartridge is in contact with an end portion of a needleless connector and a biased position in which the cartridge housing is disposed over the disposal chamber.

In aspects of the disclosure, the activation arm is a springy hinge member having an ergonomic thumb grip. In aspects of the disclosure, the activation arm further comprises a syringe alignment opening configured to be disposed over the end portion of the needleless connector in the biased position. In aspects of the disclosure, a blade cover is disposed on the top surface of the body, the blade cover comprising an outer perimeter that defines a travel extent of the cartridge housing between the non-biased and biased positions. In aspects of the disclosure, the blade cover comprises a blade disposed over the disposal chamber and configured to separate the bottommost cleaning swab from the swab cartridge when the cartridge housing is slidingly moved over the disposal chamber. In aspects of the disclosure, a connector port is disposed on the bottom surface of the body, the connector port configured to slidingly receive the end portion of the needleless connector, and a syringe port is disposed on the top surface of the body, the syringe port configured to slidingly receive an end portion of a needleless syringe.

In aspects of the disclosure, a securing member is coupled to the body, the securing member configured to move between an open position that allows the needleless connector to slidingly move within the cavity, and a closed position that secures the needleless connector into place within the cavity. In aspects of the disclosure, the securing member comprises a hinge pin coupled to the body and a protrusion, wherein the securing member is configured to pivot away from the body to reach the open position and to pivot into the body to reach the closed position, and wherein the protrusion is configured to engage a surface of the needleless connector within the cavity to secure the needleless connector. In aspects of the disclosure, the swab cartridge contains a plurality of cleaning swabs arranged in a stack, and wherein the topmost cleaning swab is colored differently than the other cleaning swabs. In aspects of the disclosure, a removable cartridge seal covers and protects a bottom portion of the swab cartridge prior to first use of the needleless connector disinfecting device, wherein the cartridge seal is configured to be pulled free to begin use of the needleless connector disinfecting device.

In one or more embodiments, a needleless connector disinfecting device comprises a body having a top surface and a bottom surface, a cavity in the body, the cavity configured to receive a needleless connector, a cartridge housing pivotably disposed on the top surface of the body, an activation arm disposed on the cartridge housing, a swab cartridge disposed in the cartridge housing, and a disposal chamber disposed in the body, the disposal chamber configured to receive used cleaning swabs, wherein the cartridge housing is configured to pivotably move on the top surface of the body between a non-biased position in which a bottommost cleaning swab in the swab cartridge is in contact with an end portion of a needleless connector and a biased position in which the cartridge housing is disposed over the disposal chamber.

In aspects of the disclosure, the activation arm is a stiff protrusion from the cartridge housing and has an ergonomic thumb grip. In aspects of the disclosure, a pivot chamber is disposed within the body, wherein a pivot portion of the cartridge housing is disposed within the pivot chamber. In aspects of the disclosure, a spring is disposed within the pivot chamber, the spring configured to provide a biasing force on the cartridge housing. In aspects of the disclosure, a blade is disposed on the top surface of the body over the disposal chamber, the blade configured to separate the bottommost cleaning swab from the swab cartridge when the cartridge housing is slidingly moved over the disposal chamber. In aspects of the disclosure, a connector port is disposed on the bottom surface of the body, the connector port configured to slidingly receive the end portion of the needleless connector.

In aspects of the disclosure, a syringe port is disposed on the top surface of the body, the syringe port configured to slidingly receive the end portion of the needleless connector from the cavity, wherein the end portion of the needleless connector protrudes out of the cavity and past the top surface of the body when the needleless connector disinfecting device is properly positioned on the needleless connector. In aspects of the disclosure, a securing member is coupled to the body, the securing member comprising a hinge pin coupled to the body and a protrusion, wherein the securing member is configured to pivot away from the body to reach an open position that allows the needleless connector to slidingly move within the cavity and to pivot into the body to reach a closed position that secures the needleless connector into place within the cavity, and wherein the protrusion is configured to engage a surface of the needleless connector within the cavity to secure the needleless connector. In aspects of the disclosure, the swab cartridge contains a plurality of cleaning swabs arranged in a stack, and wherein the topmost cleaning swab is colored differently than the other cleaning swabs.

In one or more embodiments, a method of using a needleless connector disinfecting device comprises pivoting a securing member out from a body of the needleless connector disinfecting device, inserting a needleless connector through a connector port in a bottom surface of the body and into a cavity of the body, contacting an end portion of the needleless connector with a bottommost cleaning swab in a cartridge housing disposed on a top surface of the body, pivoting the securing member into the body to secure the needleless connector within the cavity, exerting a force on an activation arm to move the cartridge housing from a non-biased position to a biased position, wherein in the non-biased position the cartridge housing is disposed over a syringe port that is aligned with the connector port and the cavity, and wherein in the biased position the cartridge housing is disposed over a disposal chamber in the body, separating the bottommost cleaning swab with a separating blade disposed over the disposal chamber when the cartridge housing is moved into the biased position, receiving the separated cleaning swab into the disposal chamber, releasing the force on the activation arm, moving the cartridge housing from the biased position back to the non-biased position via a spring member, and contacting the end portion of the needleless connector with a bottommost cleaning swab in the cartridge housing.

It is understood that any specific order or hierarchy of blocks in the methods of processes disclosed is an illustration of example approaches. Based upon design or implementation preferences, it is understood that the specific order or hierarchy of blocks in the processes may be rearranged, or that all illustrated blocks be performed. In some implementations, any of the blocks may be performed simultaneously.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. "Determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, inserting and the like via a hardware element.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A needleless connector disinfecting device, comprising:
a body having a top surface and a bottom surface;
a cavity in the body, the cavity configured to receive a needleless connector;
an activation arm disposed on the body;
a cartridge housing disposed on the activation arm;
a swab cartridge disposed in the cartridge housing;
a disposal chamber disposed in the body, the disposal chamber configured to receive used cleaning swabs;
a blade cover disposed on the top surface of the body, the blade cover comprising an outer perimeter that defines a travel extent of the cartridge housing between the non-biased and biased positions,
wherein the activation arm is configured to slidably move the cartridge housing on the top surface of the body between a non-biased position in which a bottommost cleaning swab in the swab cartridge is in contact with an end portion of a needleless connector and a biased position in which the cartridge housing is disposed over the disposal chamber,
wherein the blade cover comprises a blade disposed over the disposal chamber and configured to separate the bottommost cleaning swab from the swab cartridge when the cartridge housing is slidingly moved over the disposal chamber.

2. The needleless connector disinfecting device of claim 1, wherein the activation arm is a springy hinge member having an ergonomic thumb grip.

3. The needleless connector disinfecting device of claim 2, wherein the activation arm further comprises a syringe alignment opening configured to be disposed over the end portion of the needleless connector in the biased position.

4. The needleless connector disinfecting device of claim 1, further comprising:
a connector port disposed on the bottom surface of the body, the connector port configured to slidingly receive the end portion of the needleless connector; and
a syringe port disposed on the top surface of the body, the syringe port configured to slidingly receive an end portion of a needleless syringe.

5. The needleless connector disinfecting device of claim 1, further comprising:
a securing member coupled to the body, the securing member configured to move between an open position that allows the needleless connector to slidingly move within the cavity, and a closed position that secures the needleless connector into place within the cavity.

6. The needleless connector disinfecting device of claim 5, wherein the securing member comprises:
a hinge pin coupled to the body; and
a protrusion,
wherein the securing member is configured to pivot away from the body to reach the open position and to pivot into the body to reach the closed position,
and wherein the protrusion is configured to engage a surface of the needleless connector within the cavity to secure the needleless connector.

7. The needleless connector disinfecting device of claim 1, wherein the swab cartridge contains a plurality of cleaning swabs arranged in a stack, and wherein the topmost cleaning swab is colored differently than the other cleaning swabs.

8. The needleless connector disinfecting device of claim 1, further comprising a removable cartridge seal that covers and protects a bottom portion of the swab cartridge prior to first use of the needleless connector disinfecting device, wherein the cartridge seal is configured to be pulled free to begin use of the needleless connector disinfecting device.

9. A needleless connector disinfecting device, comprising:
a body having a top surface and a bottom surface;
a cavity in the body, the cavity configured to receive a needleless connector;
an activation arm disposed on the body;
a cartridge housing disposed on the activation arm;
a swab cartridge disposed in the cartridge housing;
a disposal chamber disposed in the body, the disposal chamber configured to receive used cleaning swabs;
a securing member coupled to the body, the securing member configured to move between an open position that allows the needleless connector to slidingly move within the cavity, and a closed position that secures the needleless connector into place within the cavity,
wherein the activation arm is configured to slidably move the cartridge housing on the top surface of the body between a non-biased position in which a bottommost cleaning swab in the swab cartridge is in contact with an end portion of a needleless connector and a biased position in which the cartridge housing is disposed over the disposal chamber,
wherein the securing member comprises:
a hinge pin coupled to the body; and
a protrusion,
wherein the securing member is configured to pivot away from the body to reach the open position and to pivot into the body to reach the closed position,
and wherein the protrusion is configured to engage a surface of the needleless connector within the cavity to secure the needleless connector.

10. The needleless connector disinfecting device of claim 9, wherein the activation arm is a springy hinge member having an ergonomic thumb grip.

11. The needleless connector disinfecting device of claim 10, wherein the activation arm further comprises a syringe alignment opening configured to be disposed over the end portion of the needleless connector in the biased position.

12. The needleless connector disinfecting device of claim 9, further comprising a blade cover disposed on the top surface of the body, the blade cover comprising an outer perimeter that defines a travel extent of the cartridge housing between the non-biased and biased positions.

13. The needleless connector disinfecting device of claim 12, wherein the blade cover comprises a blade disposed over the disposal chamber and configured to separate the bottommost cleaning swab from the swab cartridge when the cartridge housing is slidingly moved over the disposal chamber.

14. The needleless connector disinfecting device of claim 9, further comprising:
a connector port disposed on the bottom surface of the body, the connector port configured to slidingly receive the end portion of the needleless connector; and
a syringe port disposed on the top surface of the body, the syringe port configured to slidingly receive an end portion of a needleless syringe.

15. The needleless connector disinfecting device of claim 9, wherein the swab cartridge contains a plurality of cleaning swabs arranged in a stack, and wherein the topmost cleaning swab is colored differently than the other cleaning swabs.

16. The needleless connector disinfecting device of claim 9, further comprising a removable cartridge seal that covers and protects a bottom portion of the swab cartridge prior to first use of the needleless connector disinfecting device, wherein the cartridge seal is configured to be pulled free to begin use of the needleless connector disinfecting device.

* * * * *